(12) United States Patent
Hwang et al.

(10) Patent No.: US 8,994,673 B2
(45) Date of Patent: Mar. 31, 2015

(54) DISPLAY DEVICE WITH INTEGRATED TOUCH SCREEN HAVING ELECTRICAL CONNECTIONS PROVIDED IN INACTIVE REGIONS OF DISPLAY PANEL

(75) Inventors: SangSoo Hwang, Seoul (KR); BuYeol Lee, Goyang-si (KR); TaeHwan Kim, Goyang-si (KR); YoungJoon Lee, Goyang-si (KR); SeongMo Seo, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 226 days.

(21) Appl. No.: 13/451,323

(22) Filed: Apr. 19, 2012

(65) Prior Publication Data

US 2013/0147724 A1    Jun. 13, 2013

(30) Foreign Application Priority Data

Dec. 9, 2011   (KR) .................. 10-2011-0131746
Feb. 14, 2012   (KR) .................. 10-2012-0014719

(51) Int. Cl.
*G06F 3/041*      (2006.01)
*G06F 3/044*      (2006.01)

(52) U.S. Cl.
CPC ............ *G06F 3/0412* (2013.01); *G06F 3/0416* (2013.01); *G06F 3/044* (2013.01)
USPC .......................................... 345/173; 345/174

(58) Field of Classification Search
CPC .......................................... G06F 3/041–3/048
USPC ................................................. 345/173, 174
See application file for complete search history.

(56) References Cited

U.S. PATENT DOCUMENTS

| | | | |
|---|---|---|---|
| 7,859,521 B2 * | 12/2010 | Hotelling et al. ............ | 345/173 |
| 8,031,180 B2 * | 10/2011 | Miyamoto et al. ........... | 345/173 |
| 2009/0237349 A1 * | 9/2009 | Numao ........................ | 345/102 |
| 2010/0033448 A1 * | 2/2010 | Koito et al. .................. | 345/174 |
| 2010/0110038 A1 * | 5/2010 | Mo et al. ...................... | 345/174 |
| 2010/0144391 A1 * | 6/2010 | Chang et al. ................. | 455/566 |
| 2010/0194704 A1 | 8/2010 | Koito et al. | |
| 2010/0253638 A1 | 10/2010 | Yousefor et al. | |
| 2013/0293513 A1 | 11/2013 | Hotelling et al. | |

FOREIGN PATENT DOCUMENTS

| | | |
|---|---|---|
| JP | 2007-36017 A | 2/2007 |
| JP | 2011-527787 A | 11/2011 |

* cited by examiner

*Primary Examiner* — Chanh Nguyen
*Assistant Examiner* — Roy Rabindranath
(74) *Attorney, Agent, or Firm* — Birch, Stewart, Kolasch & Birch, LLP

(57) ABSTRACT

A display device with an integrated touch screen according to an embodiment, includes a display panel including a touch screen provided in an active area of the display panel, and a display driver circuit provided in an inactive area of the display panel, the touch screen including a plurality of driving electrodes, each of the driving electrodes including a plurality of sub driving electrodes positioned in the active area of the display panel but electrically connected to each other in the inactive area of the display panel, the touch screen further including a plurality of sensing electrodes disposed between the sub driving electrodes and formed in the active area of the panel, and the display driver circuit configured to apply a common voltage to the driving electrodes and the sensing electrodes or a touch driving voltage to the driving electrodes according to a driving mode of the display panel.

16 Claims, 9 Drawing Sheets

DISPLAY DEVICE WITH INTEGRATED TOUCH SCREEN HAVING ELECTRICAL CONNECTIONS PROVIDED IN INACTIVE REGIONS OF DISPLAY PANEL

CROSS-REFERENCE TO RELATED APPLICATIONS

This application claims the priority benefit of the Korean Patent Application Nos. 10-2011-0131746 filed on Dec. 9, 2011 and 10-2012-0014719 filed on Feb. 14, 2012, which are hereby incorporated by reference as if fully set forth herein.

BACKGROUND

1. Field of the Invention

The present invention relates to a display device, and more particularly, to a display device with an integrated touch screen.

2. Discussion of the Related Art

Touch screens are a type of input device that is included in display devices such as Liquid Crystal Displays (LCDs), Field Emission Displays (FEDs), Plasma Display Panel (PDPs), Electroluminescent Displays (ELDs), and Electrophoretic Display (EPDs), and allows a user to input information by directly touching a screen with a finger, a pen or the like while looking at the screen of the display device.

Particularly, the demand of display devices with the integrated in-cell type touch screen, which include a plurality of built-in elements for providing thin portable terminals such as smart phones and tablet Personal Computers (PCs), is recently increasing.

Display devices with an integrated touch screen are categorized into an optical type, a resistive type, a capacitive type, etc. according to a sensing type. Recently, the capacitive type is mainly used for increasing the sharpness of a screen and the accuracy of touch.

Technology of a display device with an integrated capacitive-type touch screen is discussed in U.S. Pat. No. 7,859,521, etc. Particularly, U.S. Pat. No. 7,859,521 is directed to a display device with an integrated mutual capacitance type touch screen.

In a related art display device with an integrated touch screen according to U.S. Pat. No. 7,859,521, a plurality of common electrodes for display are segmented into a plurality of touch driving areas and touch sensing areas, thereby allowing mutual capacitances to be generated between the touch driving area and the touch sensing area. Therefore, the related art display device measures the change in mutual capacitances that occurs in touch, and thus determines whether there is a touch input to the screen.

For this end, the common electrodes formed on the same layer are segmented into touch areas, each of which performs the function of a touch driving electrode and the function of a touch sensing electrode. In this way, since the common electrodes that perform the functions of the touch driving electrode and touch sensing electrode are formed on the same layer, these common electrodes (performing the same function) in a touch area are respectively connected to a plurality of driving electrode lines and sensing electrode lines, in an active area of a panel. Also, in order to prevent the contact between the common electrodes that perform the functions of the touch driving electrode and touch sensing electrode, the common electrodes that perform the function of one touch driving electrode are connected to each other through a contact hole and a driving electrode connection line, in the panel.

However, as described above, in the related art display device with the integrated touch screen, an aperture ratio decreases when the driving electrode lines, sensing electrode lines, and driving electrode connection lines are formed in the active area of the panel.

Further, in order for the related art display device with the integrated touch screen to simultaneously perform a display function and a touch function, common electrodes are respectively connected to a display driver Integrated Circuit (IC) and a touch IC. Also, the touch IC needs to perform a switching function that applies a common voltage to the common electrodes in a display driving of the panel, and applies signals necessary for touch sensing to the common electrodes in a touch driving of the panel.

Therefore, the related art display device with the integrated touch screen needs to separately include a Flexible Printed Circuit (FPC) for a touch IC and an FPC for a Display Driver IC (DDI) for connecting the common electrodes and the display driver IC, and a touch IC for switching the common voltage is required to be separately manufactured. Due to these limitations, a manufacturing process is complicated and increases manufacturing cost and time.

Moreover, in the related art display device with the integrated touch screen, the driving electrode lines that connect the touch IC and the common electrodes having the function of the touch driving electrode are respectively formed in a right inactive area and left inactive area of the panel. Thus, the Bezel width of the panel is enlarged undesirably.

SUMMARY

Accordingly, the present invention is directed to provide a display device with an integrated touch screen that substantially obviates one or more problems due to limitations and disadvantages of the related art.

An aspect of the present invention is directed to providing a display device with an integrated touch screen, in which a plurality of touch driving electrodes are electrically connected to each other in an inactive area of a panel, thus increasing the aperture ratio of the panel.

Another aspect of the present invention is directed to providing a display device with an integrated touch screen, in which a function of switching a common voltage is built in a display driver IC and thus, the manufacturing cost of a separate touch IC is controlled.

Another aspect of the present invention is directed to providing a display device with an integrated touch screen, in which a routing for connecting a plurality of touch driving electrodes and a display driver IC is extended into an inactive area that is formed at an upper portion or lower portion of a panel, thus preventing the enlargement of the left and right Bezel width of the panel.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device with an integrated touch screen which includes: a touch screen including a plurality of driving electrodes which include a plurality of sub driving electrodes configuring one driving electrode by an electrical connection in an inactive area of a panel and are formed in parallel in a gate line direction of the panel, and a plurality of sensing electrodes which are respectively disposed between the sub driving electrodes and formed in parallel in a data line direction of the panel; a display driver IC applying a common voltage or a touch driving voltage to the touch screen according to a driving mode of the panel, and receiving a sensing signal from the touch screen; and a touch IC generating the touch driving voltage to apply the touch driving voltage to the display driver IC, and receiving the sensing signal from the display driver IC to detect whether a touch is performed in an active area of the panel.

According to an embodiment, the present invention provides a display device with an integrated touch screen, comprising: a display panel including a touch screen provided in an active area of the display panel, and a display driver circuit provided in an inactive area of the display panel, the touch screen including a plurality of driving electrodes, each of the driving electrodes including a plurality of sub driving electrodes positioned in the active area of the display panel but electrically connected to each other in the inactive area of the display panel, the touch screen further including a plurality of sensing electrodes disposed between the sub driving electrodes and formed in the active area of the panel, and the display driver circuit configured to apply a common voltage to the driving electrodes and the sensing electrodes or a touch driving voltage to the driving electrodes according to a driving mode of the display panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

In the below description, for convenience of a description, a display device with an integrated touch screen according to embodiments of the present invention will be exemplified as being an LCD, but the present invention is not limited thereto. The present invention may be applied to various display devices such as FEDs, PDPs, ELDs, EPDs, etc. Also, a description on the typical configuration of LCDs is not provided for the sake of brevity.

Moreover, for convenience of a description, an In Plane Switching (IPS) driving mode such as an IPS mode or a Fringe Field Switching (FFS) mode will be exemplarily described where a driving electrode and a sensing electrode (which also perform the function of a common electrode) are formed on a lower substrate together with a pixel electrode, but the present invention is not limited thereto. The structure of the present invention may be modified into various structures, for example, the present invention may be applied to a Vertical Alignment (VA) driving mode, such as a VA mode or a Twisted Nematic (TN) mode, in which a driving electrode and a sensing electrode are formed on an upper substrate of the display device.

Figure 1:
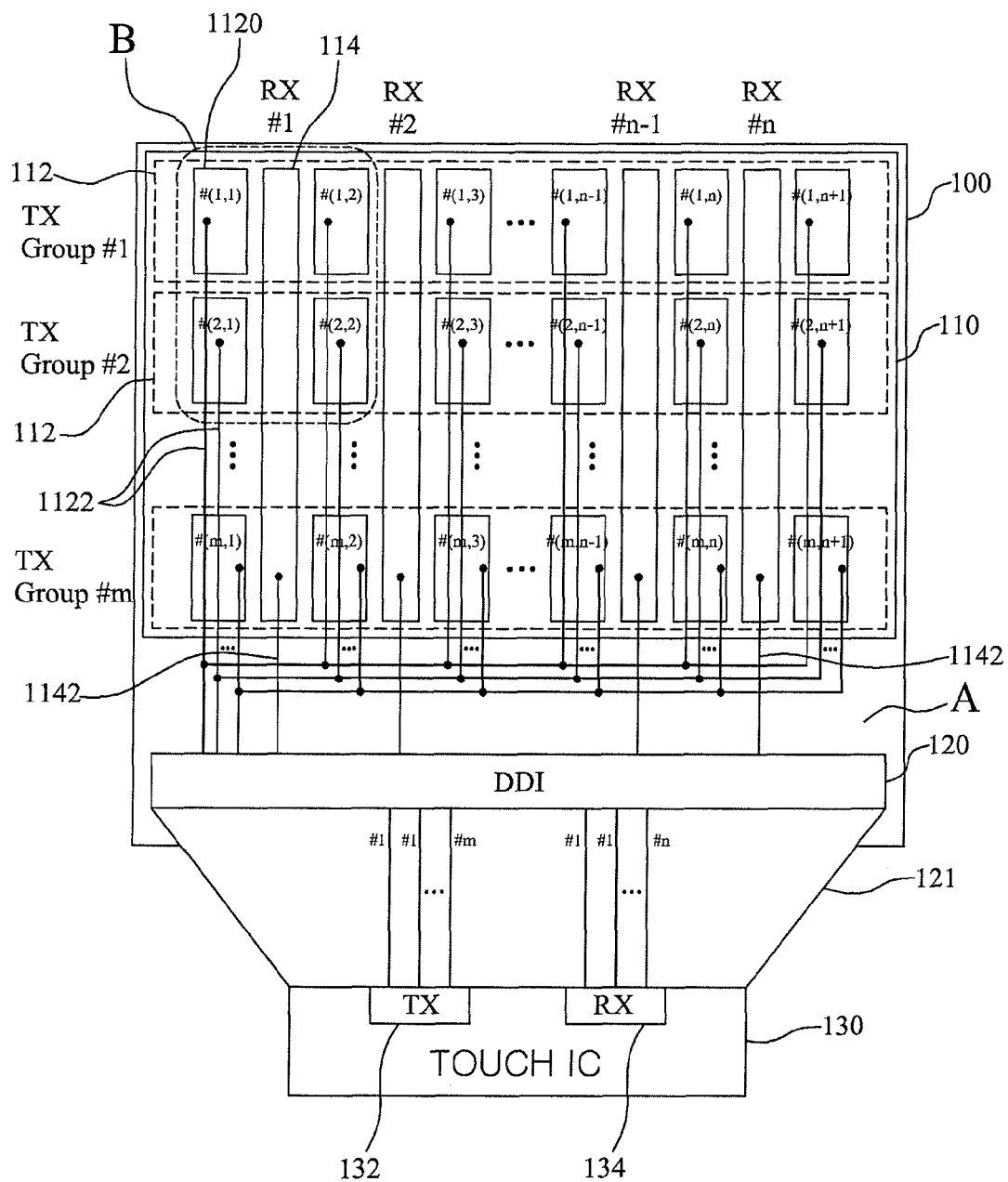
FIG. 1 is a diagram schematically illustrating a configuration of a display device with an integrated touch screen according to an embodiment of the present invention.
Figure 2:
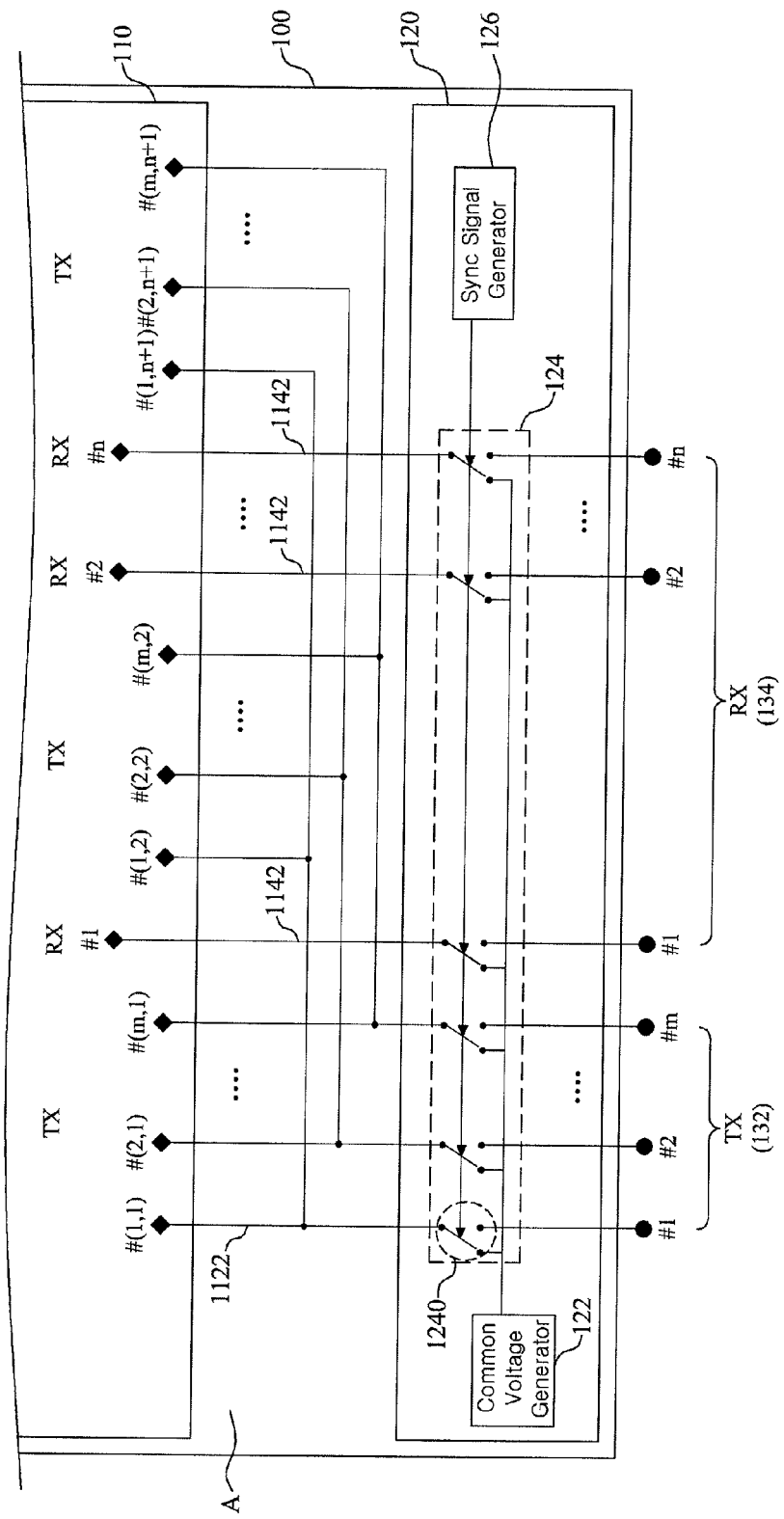
FIG. 2 is a diagram schematically illustrating a configuration of a display driver IC of the display device of FIG. 1 according to an embodiment of the present invention.
Figure 3:
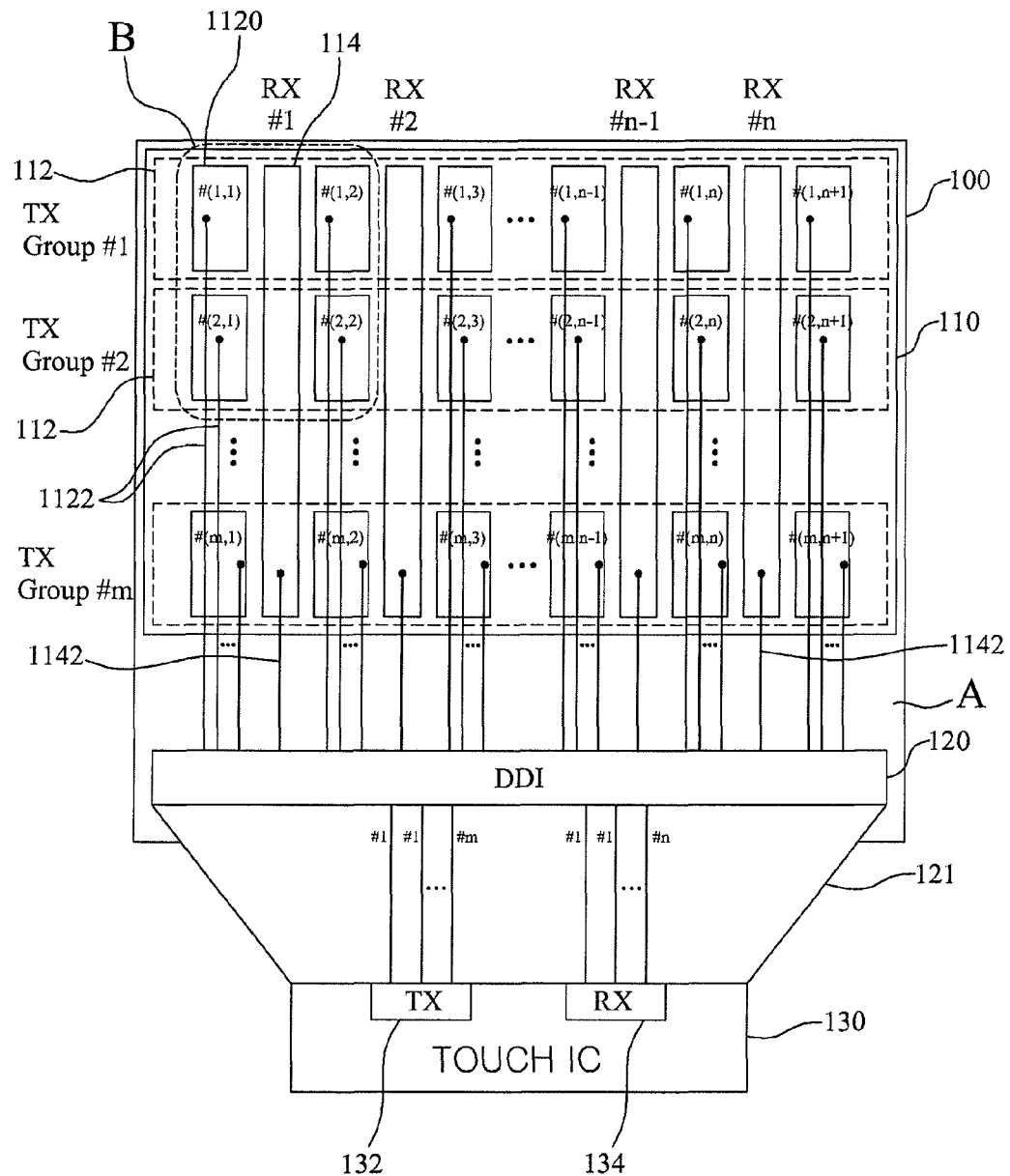
FIG. 3 is a diagram schematically illustrating a configuration of a display device with an integrated touch screen according to another embodiment of the present invention.
Figure 4:
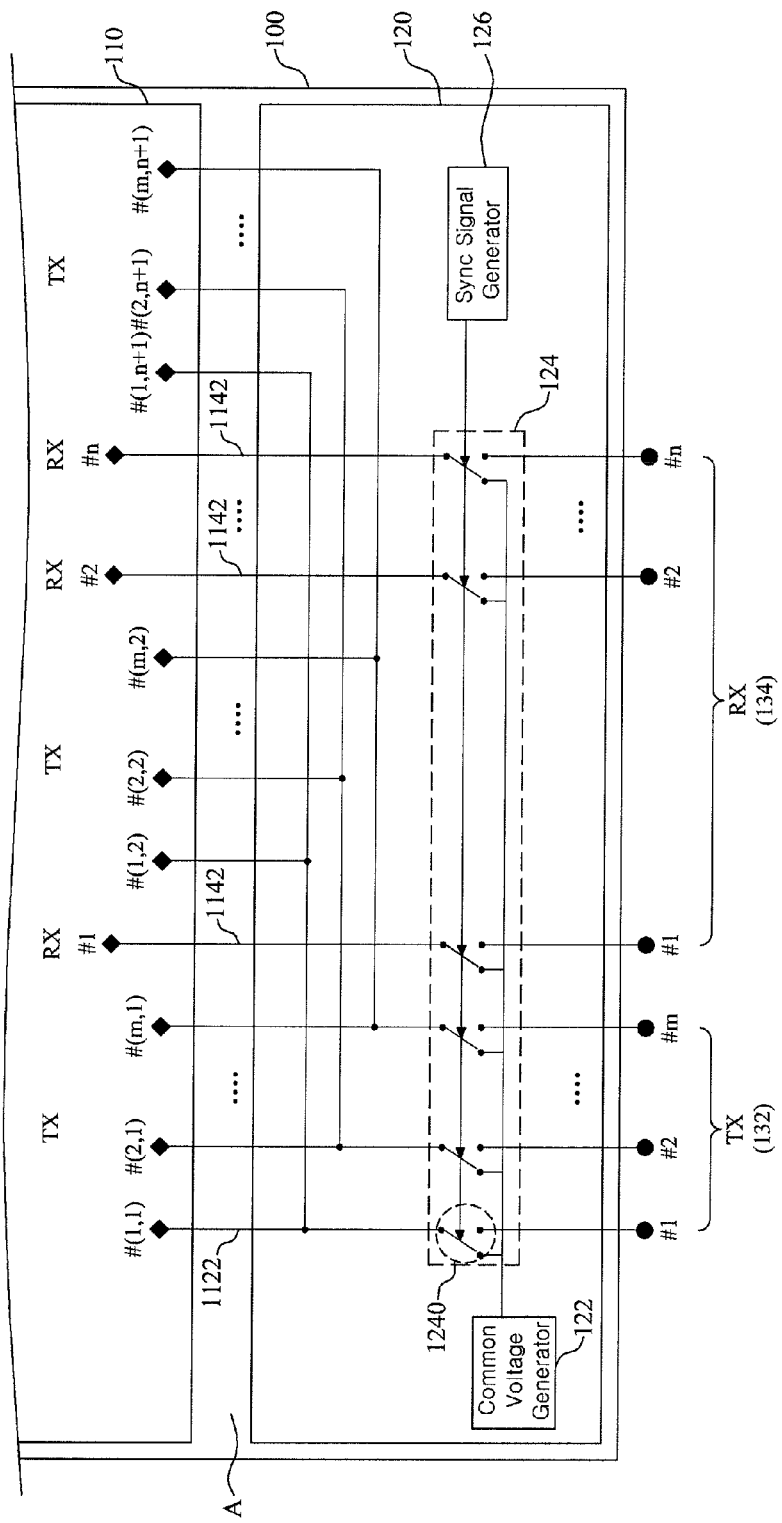
FIG. 4 is a diagram schematically illustrating a configuration of a display driver IC of the display device of FIG. 3 according to an embodiment of the present invention.

FIG. 1 is a diagram schematically illustrating a configuration of a display device with an integrated touch screen according to an embodiment of the present invention. FIG. 2 is a diagram schematically illustrating a configuration of a display driver IC of the display device of FIG. 1 according to the present invention. FIG. 3 is a diagram schematically illustrating a configuration of a display device with an integrated touch screen according to another embodiment of the present invention. FIG. 4 is a diagram schematically illustrating a configuration of a display driver IC of the display device of FIG. 3 according to the present invention.

As illustrated in FIGS. 1 and 3, the display device with the integrated touch screen includes a touch screen 110, a display driver IC 120, and a touch IC 130. The touch screen 110 is built in an active area of a panel 100 that displays a screen, and includes a plurality of driving electrodes 112 and sensing electrodes 114 used for determining a touch input to the touch screen 110. An area outside the touch area can be referred to as an inactive area of the panel 100.

The driving electrodes (Tx) 112 and the sensing electrodes (Rx) 114 also function as a common electrode for displaying images on the panel 110 when the display device is driven in a display mode. But, when the display device is driven in a touch mode, the driving electrodes 112 and the sending electrodes 114 function as touch driving electrodes and touch sensing electrodes, respectively. In other words, in the display device with the integrated touch screen according to an embodiment of the present invention, the driving electrodes and the sensing electrodes perform both a display function and a touch function depending on the driving mode of the panel 100.

For example, as illustrated in FIGS. 1 and 3, the driving electrodes 112 includes first to mth driving electrodes TX Group #1 to TX Group #m where m is a positive integer. Each of the driving electrodes TX Group #1 to TX Group #m may be configured with n+1 number of sub driving electrodes 1120 disposed in a row. Also, the sensing electrodes 114 may include first to nth sensing electrodes RX #1 to RX #n where each of the sensing electrodes RX #1 to RX #n may be disposed between two of the driving electrodes TX Group #1 to TX Group #m.

Herein, the touch screen 110 is illustrated in FIGS. 1 to 4 for understanding, but is actually built in the panel 100. An area of the touch screen 110 corresponds to an active area of the panel 100.

The driving electrodes 112 include groups of sub driving electrodes 1120, each group forming one driving electrode by an electrical connection between these sub driving electrodes in an inactive area A. Herein, the inactive area A may be formed at an upper portion or lower portion of the panel 100 corresponding to an area where the display driver IC 120 is disposed. For example, in order to configure one driving electrode, a plurality of driving electrode lines 1122 may electrically connect a group of the sub driving electrodes 1120 either in the inactive area outside the display driver IC 120 as illustrated in FIGS. 1 and 2, or electrically connected inside the display driver IC 120 as illustrated in FIGS. 3 and 4. Such groups of sub driving electrodes 1120 are also noted as the TX Groups #1 to #m.

The driving electrode line 1122 may be electrically connected in the inactive area A outside the display driver IC 120 and then connected to the display driver IC 120, or as illustrated in FIG. 3, may be connected directly to the display driver IC 120.

Accordingly, in the display device with the integrated touch screen according to embodiments of the present invention, instead of forming one driving electrode by electrically connecting the plurality of sub driving electrodes inside the touch screen or active area of the panel, the sub driving electrodes are electrically connected in the inactive area of the panel, thus increasing the aperture ratio of the panel.

The driving electrodes 112 may extend in rows parallel to each other in a width direction, which may be the direction in which a gate line of the panel 100 extends. Each of the sensing electrodes 114 may be disposed parallel to each other between the sub driving electrodes 1120, and extend in a height direction, which can be the direction of a data line of the panel 100.

In the display device with the integrated touch screen according to embodiments of the present invention, a driving electrode line (1142) is not connected to the left and right sides of the panel 100 in FIGS. 1 and 3, but is extended downwardly from each sub driving electrode of the panel 100 to a lower portion of the panel 100 corresponding to the area where the display driver IC is disposed. As a variation, if the display drive IC is disposed in an upper portion of the panel 100, then the driving electrode lines 142 would extend upwardly from the sub driving electrodes to the upper portion of the panel. Thus, the configuration of the display device of the present invention prevents the left and right width (e.g., Bezel width) of the panel 100.

Each of the driving electrodes 112 may be formed as a plurality of block type common electrodes that are respectively formed to overlap with a plurality of unit pixel areas.

Each of the sensing electrodes 114 may be formed as one block type common electrode that is formed to overlap with the unit pixel areas.

In the present embodiment, the sub driving electrodes 1120 and the sensing electrodes 114 are formed as one common electrode for a plurality of unit pixel groups, and are in an electrically connected state.

Moreover, the sub driving electrodes 1120 and the sensing electrodes 114 function as a common electrode for driving liquid crystal cells when the images are to be displayed. As such, the electrodes 1120 and 114 are preferably formed of a transparent material such as Indium Titanium Oxide (ITO).

Hereinafter, the type of the driving electrode and the type of the sensing electrode of the display device of FIG. 1 or 3 will be described in detail with reference to FIG. 5.

Figure 5:
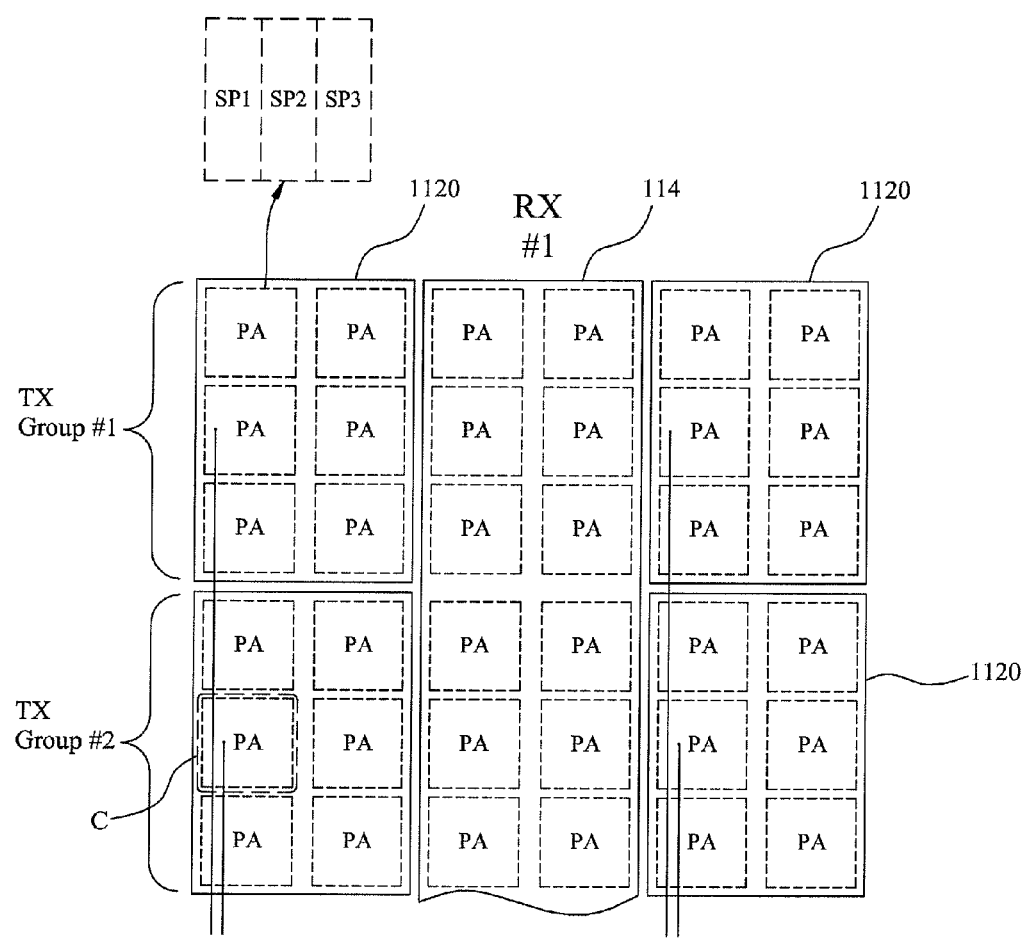
FIG. 5 is a view conceptually illustrating a relationship between a unit pixel area and a driving electrode and sensing electrode, in a display device with an integrated touch screen according to embodiments of the present invention.

FIG. 5 is a view conceptually illustrating a relationship between a unit pixel area and a driving electrode and sensing electrode, in a display device with integrated touch screen according to embodiments of the present invention. More specifically, FIG. 5 is an enlarged view of an area B in FIGS. 1 and 3.

For example, as illustrated in FIG. 5, each of the plurality of driving electrodes TX Group #1 and TX Group #2 includes a plurality of sub driving electrodes 1120, and each of the sub driving electrodes 1120 is overlapped with six unit pixel areas PA. Also, the sensing electrode RX #1 is overlapped with twelve unit pixel areas for the area B. Moreover, each unit pixel area PA may be segmented into three sub-pixel areas SP1 to SP3. Herein, the electrode RX #1 is actually overlapped with one or more unit pixel areas.

The sizes of the driving electrode and sensing electrode may be appropriately adjusted in consideration of the size of the unit pixel area and the touch area of a finger or the like for performing a touch, and thus, the number of unit pixels included in the driving electrode and the sensing electrode may also be adjusted.

Referring again to FIGS. 1 to 4, the display driver IC 120 is formed in the inactive area A of the panel 100, and selectively applies a common voltage (e.g., Vcom) or a touch driving voltage to the touch screen 110 according to the driving mode of the panel 100.

For example, when the panel 100 is driven in a display driving mode, the display driver IC 120 applies the common voltage to the driving electrodes 112 and the sensing electrodes 114 such that the driving electrodes 112 and the sensing electrodes 114 perform the function of the common electrode for driving the liquid crystal. When the panel 100 is driven in a touch driving mode, the display driver IC 120 applies a pulse type touch driving voltage to the driving electrodes 112 in order for a mutual capacitance to be generated between the driving electrodes 112 and the sensing electrodes 114. The display driver IC 120 receives a touch sensing signal, corresponding to the change of a mutual capacitance that occurs due to the touch, from the sensing electrodes 114 with a Direct Current (DC) voltage applied thereto.

The display driver IC 120 is connected to the driving electrodes 112 through the driving electrode lines 1122 that are respectively extended in parallel to the data line from the sub driving electrodes 1120 included in the touch screen 110, and connected to the plurality of sensing electrodes 114 through the sensing electrode lines 1142 that are respectively extended from the sensing electrodes 114. For example, as illustrated in FIGS. 1 and 3, the driving electrode lines 1122 may be respectively extended from the plurality of sub driving electrodes, in parallel to the data lines.

As illustrated in FIGS. 1 and 3, the sensing electrode lines 1142 can be connected at the distal ends of the sensing electrodes 114 and extended, but in another example of the present invention, the sensing electrode lines 1142 may be connected at the upper ends of the sensing electrodes 114 and extended.

In the active area of the panel 100, the driving electrode lines 1122 may be formed as respective metal layers that are connected to the sub driving electrodes 1122 through a corresponding contact hole, and formed on the data lines with an insulation layer therebetween, in parallel to the data lines. For instance, each or multiple driving electrode lines 1122 may be formed over each of the data lines of the panel 100 and extend parallel with that data lines.

Hereinafter, a connection relationship between the driving electrode line and the sub driving electrode will be described in detail with reference to FIGS. 6 to 9.

Figure 6:
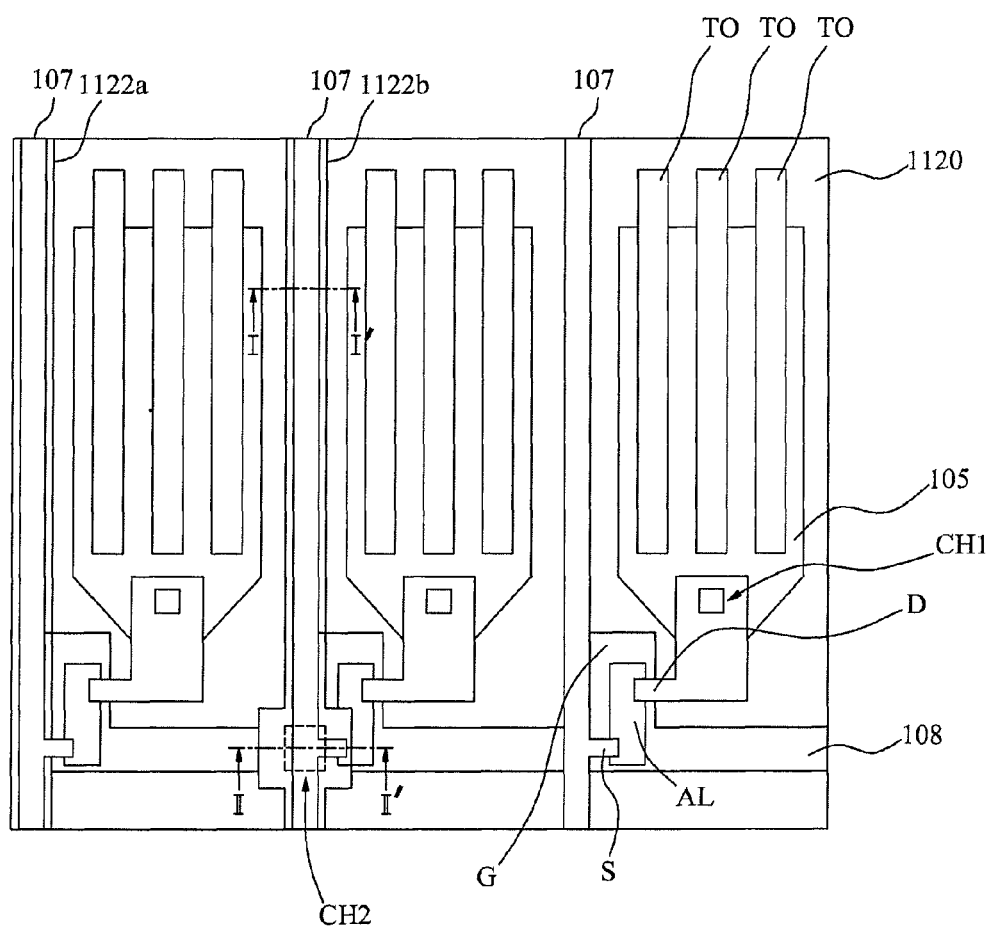
FIG. 6 is a sectional view of a unit pixel area for describing a relationship between a driving electrode line and a sub driving electrode, in the display device with the integrated touch screen according to an embodiment of the present invention.

FIG. 6 is a sectional view of a unit pixel area for describing a relationship between a driving electrode line and a sub driving electrode, in the display device with an integrated touch screen according to an embodiment of the present invention, and is an enlarged view of a unit pixel area C in FIG. 5 which corresponds to the display device of FIGS. 1 and 3. More specifically, FIG. 6 shows a configuration of a portion of one sub driving electrode 1120, where that portion corresponds to one unit pixel area PA.

Referring to FIG. 6, a plurality of pixel electrodes 105 are formed in respective areas that are defined by a plurality of gate lines 108 and a plurality of data lines 107 which are arranged in intersection with the gate lines 108. A thin film transistor is formed at each intersection of the data lines 107 and the gate lines 108. Each thin film transistor is configured with: a gate electrode G that is extended from the corresponding gate line 108; a source electrode S that is extended from the corresponding data line 107; a drain electrode D that is connected to the corresponding pixel electrode 105 through a contact hole CH1; an active layer AL disposed therebetween. Also, the sub driving electrode 1120 that is the common electrode includes a plurality of slits TO that are extended along the direction of the data lines and formed at certain intervals.

In this way, when the splits TO are formed at the common electrode, a fringe field is formed between the pixel electrode 105 and the common electrode (1120) through the slits TO, thereby enabling the driving of the liquid crystal in a fringe field switching mode.

As illustrated in FIG. 6, a plurality of driving electrode lines 1122a and 1122b may be formed in parallel to the data lines 107, and the driving electrode line 1122b and the sub driving electrode 1120 may be electrically connected to each other through a contact hole CH2. That is, as shown in FIGS. 5 and 6, for the C area, although two driving electrode lines (1122a and 1122b) are provided, only the driving electrode line 1122b is electrically connected to the corresponding sub driving electrode 120 via the contact hole CH2.

More specifically, the driving electrode line 1122a is electrically connected to a sub driving electrode included in the first driving electrode TX Group #1 of FIG. 5, and the driving electrode line 1122b is electrically connected to the sub driving electrode 1120 included in the second driving electrode TX Group #2 of FIG. 5 which is shown. As such, a driving electrode line, electrically connected to one sub driving electrode included in the driving electrode, is not electrically connected to another sub driving electrode included in the same driving electrode line. For instance, each sub driving electrode may include an electrical connection with a single driving electrode line.

In FIG. 6, each of the driving electrode lines 1122a and 1122b is formed along the corresponding data line 107, but in another example of the present invention, the driving electrode line may be formed from a position connected to the sub driving electrode. In other words, the driving electrode line may be formed from the contact hole CH2 that is connected to the sub driving electrode and the driving electrode line.

In the above description of the unit pixel structure according to the present embodiment, the unit pixel included in the driving electrode (112) has been described referring to FIG. 6 as an example. However, the concept is equally applicable to the sensing electrode and the sensing electrode line. Therefore, the sensing electrode (114) and the sensing electrode line (1142) may be electrically connected through the contact hole CH2 at a position where the sensing electrode is connected to the sensing electrode line, identically or similar to the structure of FIG. 6.

Figure 7:
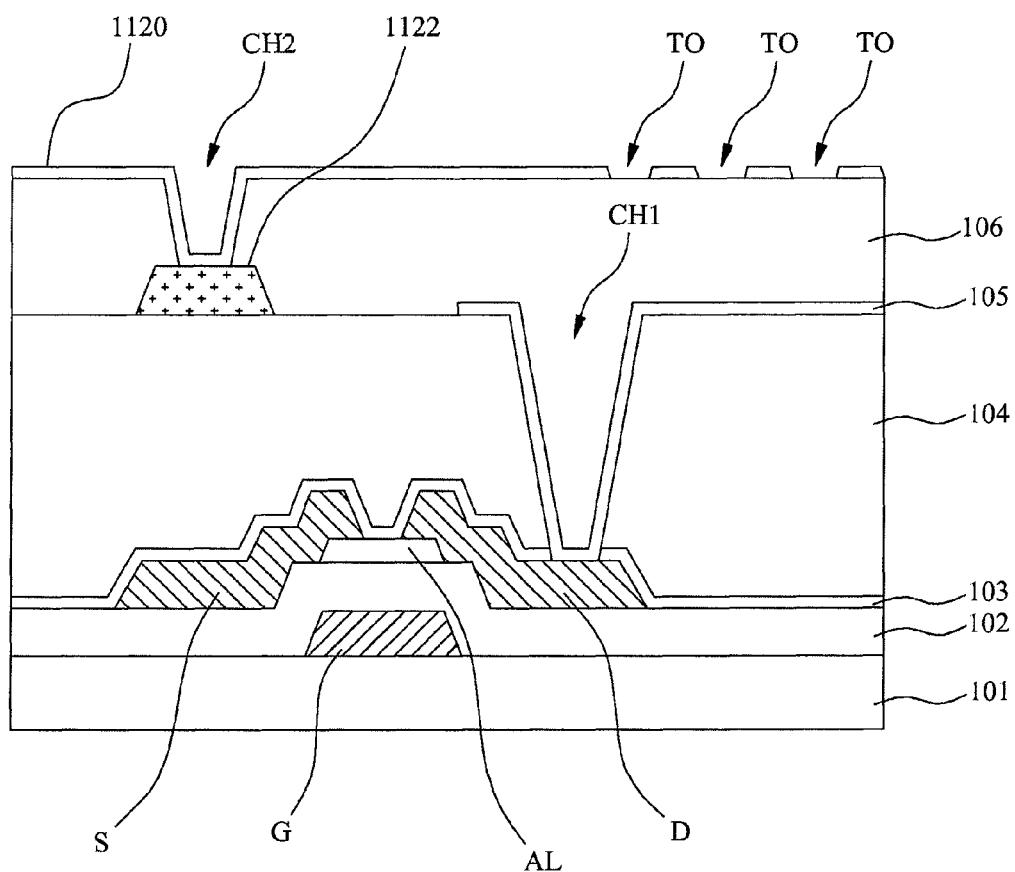
FIG. 7 is a sectional view of a sub-pixel area for describing the relationship between the driving electrode line and the sub driving electrode, in the display device with the integrated touch screen according to an embodiment of the present invention.

FIG. 7 is a sectional view of an example of a sub-pixel area (e.g., SP1 in FIG. 5) for describing the relationship between the driving electrode line and the sub driving electrode, in the display devices of FIGS. 1-6 according to an embodiment of the present invention.

For example, as illustrated in FIG. 7, in a lower substrate of the panel 100, a gate electrode G, an active layer AL, a source electrode S, a drain electrode D, a pixel electrode 105, a driving electrode line 1122, and a sub driving electrode (common electrode) 1120 are formed on a lower base substrate 101. To insulate elements, a gate insulation layer 102, a passivation layer 103, a dielectric layer 104, and a passivation layer 106 are stacked on the lower base substrate 101. Also, the sub driving electrode 1120 that is the common electrode includes a plurality of slits TO that are formed at certain intervals and extending along the direction of the data line.

The drain electrode D is connected to the pixel electrode 105 through the contact hole CH1 that is formed at the passivation 103 and the dielectric layer 104. Also, the driving electrode line 1122 may be formed as a metal layer 1122 that is connected to the sub driving electrode 1120 through the contact hole CH2, and formed on the same plane as the pixel electrode 105.

Figure 8:
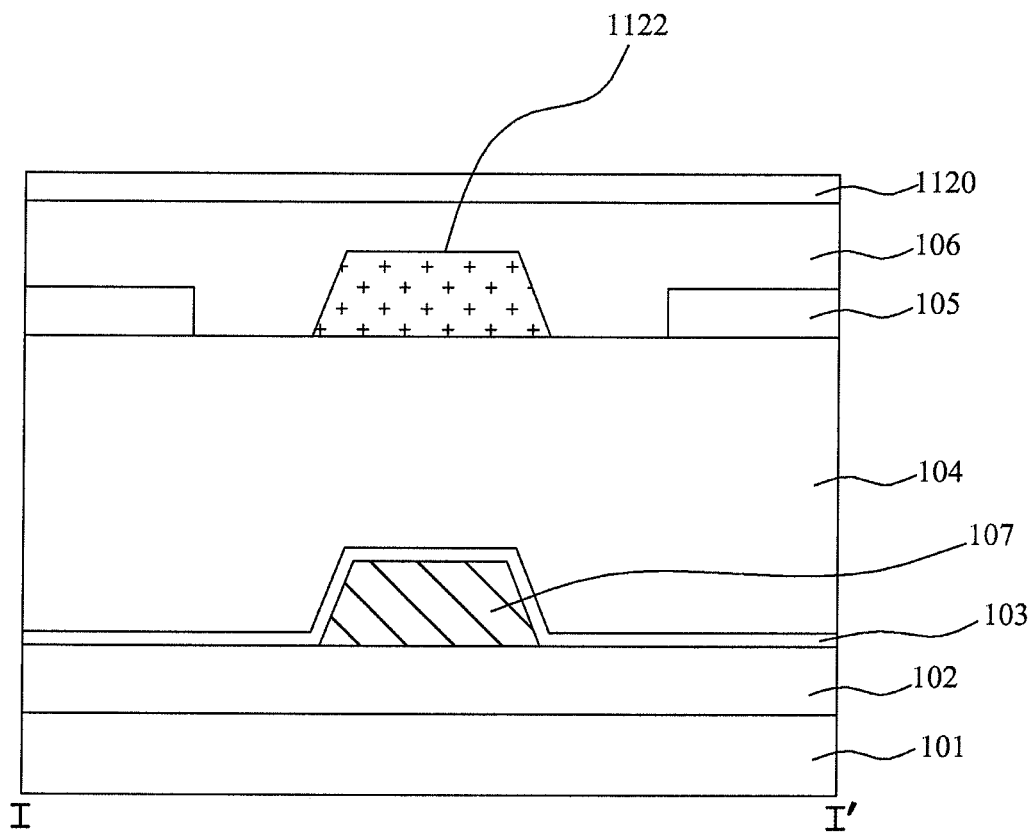
FIG. 8 is a sectional view taken along line I-I' of FIG. 6.
Figure 9:
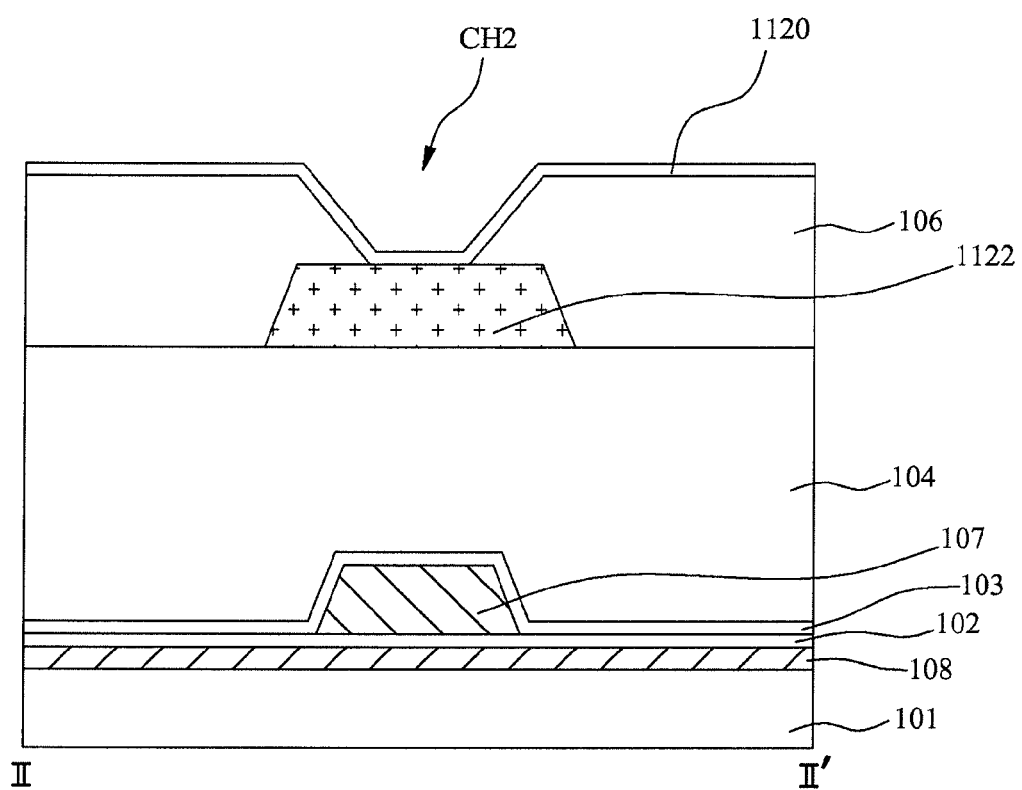
FIG. 9 shows a portion of a sectional view taken along line II-II' of FIG. 6.

FIG. 8 is a sectional view taken along line I-I' of FIG. 6, and illustrates a portion where the driving electrode line 1122 is not connected to the sub driving electrode 1120. FIG. 9 shows a portion of a sectional view taken along line II-II' of FIG. 6, and illustrates a position where the driving electrode line 1122 is connected to the sub driving electrode 1120 through the contact hole CH2. Although the line II-EP crosses over the source electrode S and the active layer AL, FIG. 9 on purpose is not showing the source electrode S and the active layer AL for the sake of clarity and primarily shows the data line 107 and its relationship with the driving electrode line 1122.

For example, as illustrated in FIGS. 8 and 9, the sub driving electrode 1120 that is used as the common electrode may be formed at a surface of the lower substrate of the panel 100, and the driving electrode line 1122 may be formed in parallel to the data line 107 with the dielectric layer 104 and passivation layer 103 (being an insulating material) therebetween. Herein, the driving electrode line 1122 may be formed of a metal different from that of the data line 107 or sub driving electrode 1120.

When the driving electrode line 1122 that is electrically connected to a sub driving electrode included in another driving electrode passes through the current sub driving electrode or when the driving electrode line 1122 merely extends along the unit pixel area PA under the sub driving electrode 1120, as illustrated in FIG. 8, the driving electrode line 1122 is insulated from the sub driving electrode 1120 by an insulating material such as the passivation layer 106. Thus, the driving electrode line 1122 is electrically insulated from the sub driving electrode 1120 for that area.

In order for the sub driving electrode 1120 to be electrically connected to the driving electrode line 1122, as illustrated in FIG. 9, the sub driving electrode 1120 may be connected to the driving electrode line 1122 though the contact hole CH2 that is formed at the passivation layer 106. In that case, the sub driving electrode 1120 may contact the driving electrode line 1122 through the contact hole CH2.

Referring again to FIGS. 1 to 4, the display driver IC 120 may include a common voltage generator 122, a switching unit 124, and a sync signal generator 126, for applying the common voltage or the touch driving voltage to the touch screen 110 according to the driving mode of the panel 100 and receiving the sensing signal from the touch screen 110.

The display driver IC 120 may further include a gate driver that applies a scan signal to the gate lines, a data driver that respectively applies a plurality of image data signals to the data lines, and a controller that controls certain elements. The certain elements are general elements included in the display driver IC 120, and thus, their detailed description is not provided.

The common voltage generator 122 generates the common voltage that is applied to the driving electrodes 112 or sensing electrodes 114 included in the touch screen 110. For instance, the driving electrodes 112 and the sensing electrodes 114 according to embodiments of the present invention perform the function of the common electrode, and thus, the common voltage generator 122 generates the common voltage for driving the liquid crystal cells when the panel 100 is driven in the display driving mode.

The switching unit 124 connects the driving electrodes 112 and sensing electrodes to the common voltage generator 122 or to the touch IC 120, according to a synch signal indicating the driving mode. For example, when a first sync signal (indicating that the driving mode of the panel 100 is in the display driving mode) is inputted to the switching unit 124, the driving electrodes 112 and the sensing electrodes 114 are connected to the common voltage generator 122, and thus, the common voltage generated by the common voltage generator 122 is applied to the driving electrodes 112 through the respective driving electrode lines 1122 and to the sensing electrodes 114 through the respective sensing electrode lines 1142. On the other hand, when a second sync signal (indicating that the driving mode of the panel 100 is in the touch driving mode) is inputted to the switching unit 124, the driving electrodes 112 and the sensing electrodes 114 are connected to the touch IC 130 and thus, the touch driving voltage is applied to the driving electrodes 112 through the respective driving electrode lines 1122, and a plurality of touch sensing signals are respectively received from the sensing electrodes 114 through the sensing electrode lines 1142.

However, a related art display driver IC applies a common voltage to a touch IC and includes a switching function (which is built in the touch IC) for applying the common voltage to a driving electrode and a sensing electrode, but when the common voltage is a negative voltage, the manufacturing process and design of the existing touch IC need to be modified for accommodating the negative voltage. To address this limitation, in the present invention, the switching function for the common voltage is built in the display driver IC 120 and thus addresses this limitation, and moreover, by using the existing touch IC without manufacturing a separate touch IC, the manufacturing cost can be saved.

The switching unit 124 includes a plurality of switches 1240 that are respectively connected to the driving electrodes 112 and the sensing electrodes 114. The switches 1240 are connected to the driving electrodes 112 and the sensing electrodes 114, respectively. For example, the number of switches 124 included in the switching unit 124 may be proportional to the number of driving electrodes 112 and sensing electrodes 114 that are formed in the panel 100.

Each of the plurality of driving electrode lines 1122, which are respectively connected to the plurality of sub driving electrodes #(1,1), #(1,2), . . . , #(1,n+1) included in the first driving electrode TX Group #1, is formed in parallel to the data line or the sensing electrode 1142 in the active area of the panel 100. The driving electrode lines 1122 are electrically connected, inside the display driver IC 120 outside the touch screen or in the inactive area A outside the display driver IC 120. Only one driving electrode line 1122 is connected to one switch 1240 of the switching unit 124; however, variations are possible.

Likewise, each of the plurality of driving electrode lines 1122, which are respectively connected to the plurality of sub driving electrodes #(2,1), #(2,2), . . . , #(2,n+1) included in the second driving electrode TX Group #2, is formed in parallel to the data line or the sensing electrode 1142 in the active area of the panel 100. The driving electrode lines 1122 are electrically connected, inside the display driver IC 120 or in the inactive area A outside the display driver IC 120. Only one driving electrode line 1122 is connected to one switch 1240 of the switching unit 124 in this example.

The sensing electrode lines 1142 are respectively connected to the sensing electrodes 114, and each of the sensing electrode lines 1142 is separately connected to one switch 1240 of the switching unit 124.

Therefore, the driving electrodes (touch driving electrodes) and the sensing electrodes (touch sensing electrodes) according to embodiments of the present invention are respectively connected to the switches 124 equal to the number of driving electrodes and sensing electrodes.

The sync signal generator 126, as described above, generates a sync signal indicating the driving mode of the panel 100. For example, at an image output time when the panel 100 is driven in the display driving mode, the sync signal generator 126 generates the first sync signal that allows the driving electrodes 112 and the sensing electrodes 114 to be connected to the common voltage generator 122 for displaying images. At a touch sensing time when the panel 100 is driven in the touch driving mode, the sync signal generator 126 generates the second sync signal that allows the driving electrodes 112 and the sensing electrodes 114 to be connected to the touch IC 130 for detecting touch inputs to the touch screen.

Specifically, the sync signal generator 126 outputs the first sync signal to the switching unit 124 at the image output time, and thus allows the driving electrodes 112 and the sensing electrodes 114 to be connected to the common voltage generator 122. At this point, the common voltage is applied to the driving electrodes 112 and the sensing electrodes 114, and thus, the driving electrodes 112 and the sensing electrodes 114 perform the function of the common electrode for displaying images on the panel 100.

On the other hand, the sync signal generator 126 outputs the second sync signal to the switching unit 124 at the touch sensing time, and thus allows the driving electrodes 112 and the sensing electrodes 114 to be connected to the touch IC 130. The sync signal generator 126 may be the controller of the display driver IC 120, or generate and output the sync signals according to the controller of the display driver IC 120. The sync signal generator 126 may transfer the sync signals to the touch IC 130, thereby controlling the operation of the touch IC 130.

In the display device with the integrated touch screen according to embodiments of the present invention, the sync signal has been described above as being generated by the sync signal generator 126 inside the display driver IC 120, but in another example of the present invention, the sync signal may be inputted from outside the display driver IC 120. The sync signal may be generated outside the display driver IC 120 and inputted to the switching unit 124 inside the display driver IC 120.

The touch IC 130 generates the touch driving voltage to apply the touch driving voltage to the display driver IC 120, and receives the touch sensing signal from the display driver IC 120 to detect whether a touch is performed in the active area of the panel 100. The touch IC 130, as illustrated in FIGS. 1 and 3, may be connected to the display driver IC 120 through a flexible printed circuit board 121. In another embodiment of the present invention, the touch IC 130 may be provided inside the display driver IC 120.

The plurality of switches 1240, which are respectively connected to the driving electrode lines 1122 inside the display driver IC 120, are connected to a driver (transmitter) 132 of the touch IC 130. The plurality of switches 1240, respectively connected to the sensing electrode lines 1142, are connected to a sensing unit 134 of the touch IC 130.

Therefore, when the switching unit 124 is switched by the second sync signal, a driving voltage generated by the driver 132 of the touch IC 130 is applied to the driving electrodes 112 through the respective driving electrode lines 1122 that are connected to the switches 1240, and respective touch sensing signals, which are generated by the sensing electrodes 114 with the driving voltage applied to the driving electrodes 112, are applied to the sensing unit (receiver) 134 of the touch IC 130 through the sensing electrode lines 1142 that are respectively connected to the switches 1240.

According to the embodiments of the present invention, instead of forming one driving electrode by electrically connecting the plurality of sub driving electrodes inside the touch screen area or the active area of the panel, the sub driving electrodes are electrically connected in the inactive area of the panel, thus increasing the aperture ratio of the panel.

Moreover, the function of switching the common voltage is built in the display driver IC, and thus, the existing touch IC can be used without manufacturing a separate touch IC, whereby the manufacturing cost can be saved or reduced.

Moreover, instead of connecting the driving electrode line to the left and right sides of the panel, the driving electrode line connected to the sub driving electrodes of the panel is extended to the upper portion or lower portion of the panel where the display driver IC is disposed, thus preventing the left and right width (i.e., left and right Bezel width) of the panel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device with an integrated touch screen, comprising:
   a display panel including a touch screen provided in an active area of the display panel, and a display driver circuit provided in an inactive area of the display panel, the inactive area excluding the active area,
   the touch screen including a plurality of driving electrodes and a plurality of electrode lines, the plurality of electrode lines extending from the driving electrodes positioned in the active area to the display driver circuit positioned in the inactive area, the plurality of electrode lines not being electrically connected to each other within the active area but being electrically connected to each other within the inactive area,
   each of the driving electrodes including a plurality of sub driving electrodes positioned in the active area of the display panel but electrically connected to each other in the inactive area via the plurality of electrode lines that are electrically connected to each other in the inactive area,
   the touch screen further including a plurality of sensing electrodes disposed between the sub driving electrodes and formed in the active area of the panel, and
   the display driver circuit configured to apply, via the plurality of electrode lines, a common voltage to the driving electrodes and the sensing electrodes or a touch driving voltage to the driving electrodes according to a driving mode of the display panel,
   wherein the display driver circuit includes a common voltage generator configured to generate the common voltage, and
   wherein the display driver circuit further includes:
   a synchronization signal generator configured to generate a first synchronization signal when the driving mode of the display panel is in a display mode, and to generate a second synchronization signal when the driving mode of the display panel is in a touch mode, and
   a switching unit configured to apply the generated common voltage to the driving electrodes and the sensing electrodes when the first synchronization signal is received from the synchronization signal generator, and to apply the touch driving voltage to the driving electrodes when the second synchronization signal is received from the synchronization signal generator.

2. The display device of claim 1, further comprising: a touch circuit configured to generate the touch driving voltage and apply the generated touch driving voltage to the display driver circuit, and to receive a touch sensing signal from the display driver circuit to detect a touch input to the touch screen.

3. The display device of claim 1, wherein the plurality of sub driving electrodes are electrically connected to each other inside the display driver circuit provided in the inactive area of the display panel.

4. The display device of claim 1, wherein the plurality of sub driving electrodes are electrically connected to each other outside the display driver circuit provided in the inactive area of the display panel.

5. The display device of claim 1, wherein the plurality of sub driving electrodes are a plurality of block type common electrodes which are formed to respectively overlap with a plurality of unit pixel areas, and
   each of the sensing electrodes is a block type common electrode which is formed to overlap with the plurality of unit pixel areas.

6. The display device of claim 1, wherein when the driving mode of the display panel is in the display mode, the display driver circuit applies the common voltage to the driving electrodes and the sensing electrodes functioning as a common electrode for displaying images.

7. The display device of claim 1, wherein when the driving mode of the display panel is in the touch mode, the display driver circuit applies the touch driving voltage to the driving electrodes for detecting a touch input to the touch screen.

8. A display device with an integrated touch screen, comprising:
- a display panel including a touch screen provided in an active area of the display panel, and a display driver circuit provided in an inactive area of the display panel, the inactive area excluding the active area,
- the touch screen including a plurality of driving electrodes and a plurality of electrode lines, the plurality of electrode lines extending from the driving electrodes positioned in the active area to the display driver circuit positioned in the inactive area, the plurality of electrode lines not being electrically connected to each other within the active area but being electrically connected to each other within the inactive area,
- each of the driving electrodes including a plurality of sub driving electrodes positioned in the active area of the display panel but electrically connected to each other in the inactive area via the plurality of electrode lines that are electrically connected to each other in the inactive area,
- the touch screen further including a plurality of sensing electrodes disposed between the sub driving electrodes and formed in the active area of the panel, and
- the display driver circuit configured to apply, via the plurality of electrode lines, a common voltage to the driving electrodes and the sensing electrodes or a touch driving voltage to the driving electrodes according to a driving mode of the display panel,
- wherein the driving electrodes include:
- a first driving electrode having a group of first sub driving electrodes extending in a first direction, the group of the first sub driving electrodes being electrically connected to first electrode lines among the plurality of electrode lines, and
- a second driving electrode having a group of second sub driving electrodes extending in the first direction, the group of the second sub driving electrodes being electrically connected to second electrode lines among the plurality of electrode lines,
- wherein all the first electrode lines are connected to each other in the inactive display area excluding the active area, and all the second electrode lines are connected to each other in the inactive area excluding the active area, and
- wherein only one first electrode line is electrically connected to each of the first sub driving electrodes, and only one second electrode line is electrically connected to each of the second sub driving electrodes.

9. The display device of claim 8, wherein the display driver circuit further includes:
- a synchronization signal generator configured to generate a synchronization signal, and
- a plurality of switches corresponding respectively to the first and second electrode lines, and simultaneously operating according to the synchronization signal.

10. The display device of claim 8, wherein the first and second electrode lines extend to a portion of the display panel where the display driver circuit is disposed.

11. The display device of claim 8, wherein the first sub driving electrodes respectively correspond with the second sub driving electrodes, and
- for each of the second sub driving electrodes, the first electrode line originating from the corresponding first sub driving electrode passes through under the corresponding second sub driving electrode without contacting the corresponding second sub driving electrode.

12. The display device of claim 8, wherein each of the first sub driving electrodes is electrically connected to one of the first electrode lines through a first contact hole, and
- each of the second sub driving electrodes is electrically connected to one of the second electrode lines through a second contact hole.

13. A display device with an integrated touch screen, comprising:
- a display panel including a touch screen provided in an active area of the display panel, and a display driver circuit provided in an inactive area of the display panel, the inactive area excluding the active area,
- the touch screen including a plurality of driving electrodes and a plurality of electrode lines, the plurality of electrode lines extending from the driving electrodes positioned in the active area to the display driver circuit positioned in the inactive area, the plurality of electrode lines not being electrically connected to each other within the active area but being electrically connected to each other within the inactive area,
- each of the driving electrodes including a plurality of sub driving electrodes positioned in the active area of the display panel but electrically connected to each other in the inactive area via the plurality of electrode lines that are electrically connected to each other in the inactive area,
- the touch screen further including a plurality of sensing electrodes disposed between the sub driving electrodes and formed in the active area of the panel, and
- the display driver circuit configured to apply, via the plurality of electrode lines, a common voltage to the driving electrodes and the sensing electrodes or a touch driving voltage to the driving electrodes according to a driving mode of the display panel,
- wherein the driving electrodes include:
- a first driving electrode having a group of first sub driving electrodes extending in a first direction, the group of the first sub driving electrodes being electrically connected to first electrode lines among the plurality of electrode lines, and
- a second driving electrode having a group of second sub driving electrodes extending in the first direction, the group of the second sub driving electrodes being electrically connected to second electrode lines among the plurality of electrode lines,
- wherein all the first electrode lines are connected to each other in the inactive display area excluding the active area, and all the second electrode lines are connected to each other in the inactive area excluding the active area,
- wherein the sensing electrodes include:
- a first sensing electrode extending in a second direction between two neighboring first sub driving electrodes among the group of first sub driving electrodes, and between two neighboring second sub driving electrodes among the group of second sub driving electrodes, and
- a second sensing electrode extending in the second direction between two neighboring first sub driving electrodes among the group of first sub driving electrodes, and between two neighboring second sub driving electrodes among the group of second sub driving electrodes, and
- wherein the first and second sensing electrodes are substantially parallel to each other.

14. The display device of claim 13, wherein the first and second directions are substantially perpendicular to each other.

15. A display device with an integrated touch screen, comprising:
a display panel including a touch screen provided in an active area of the display panel, and a display driver circuit provided in an inactive area of the display panel,
the touch screen including a plurality of driving electrodes, each of the driving electrodes including a plurality of sub driving electrodes positioned in the active area of the display panel but electrically connected to each other in the inactive area of the display panel,
the touch screen further including a plurality of sensing electrodes disposed between the sub driving electrodes and formed in the active area of the panel, and
the display driver circuit configured to apply a common voltage to the driving electrodes and the sensing electrodes or a touch driving voltage to the driving electrodes according to a driving mode of the display panel,
wherein the display driver circuit includes:
a common voltage generator configured to generate the common voltage,
a synchronization signal generator configured to generate a first synchronization signal when the driving mode of the display panel is in a display mode, and to generate a second synchronization signal when the driving mode of the display panel is in a touch mode, and
a switching unit configured to apply the generated common voltage to the driving electrodes and the sensing electrodes when the first synchronization signal is received from the synchronization signal generator, and to apply the touch driving voltage to the driving electrodes when the second synchronization signal is received from the synchronization signal generator.

16. A display device with an integrated touch screen, comprising:
a display panel including a touch screen provided in an active area of the display panel, and a display driver circuit provided in an inactive area of the display panel,
the touch screen including a plurality of driving electrodes, each of the driving electrodes including a plurality of sub driving electrodes positioned in the active area of the display panel but electrically connected to each other in the inactive area of the display panel,
the touch screen further including a plurality of sensing electrodes disposed between the sub driving electrodes and formed in the active area of the panel, and
the display driver circuit configured to apply a common voltage to the driving electrodes and the sensing electrodes or a touch driving voltage to the driving electrodes according to a driving mode of the display panel,
wherein the driving electrodes include:
a first driving electrode having a group of first sub driving electrodes extending in a first direction, each of the first sub driving electrodes electrically connected to a first connection line, and
a second driving electrode having a group of second sub driving electrodes extending in the first direction, each of the second sub driving electrodes electrically connected to a second connection line,
wherein all the first connection lines are connected to each other in the inactive display area excluding the active area, and all the second connection lines are connected to each other in the inactive area excluding the active area,
wherein only one first connection line is electrically connected to each of the first sub driving electrodes, and only one second connection line is electrically connected to each of the second sub-driving electrodes, and
wherein the first sub driving electrodes respectively correspond with the second sub driving electrodes, and for each of the second sub driving electrodes, the first connection line originating from the corresponding first sub driving electrode passes through under the corresponding second sub driving electrode without contacting the corresponding second sub driving electrode.

* * * * *